Dec. 6, 1960  H. M. PURDY  2,963,300
VEHICLE FRAME
Filed Sept. 25, 1956  2 Sheets-Sheet 1
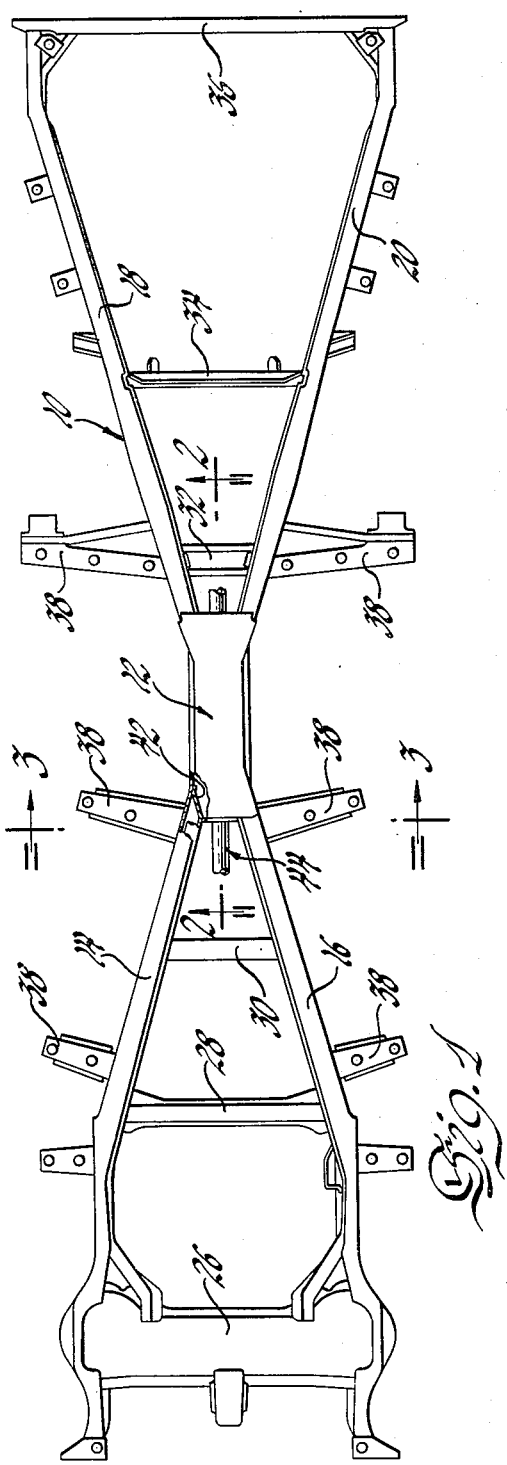
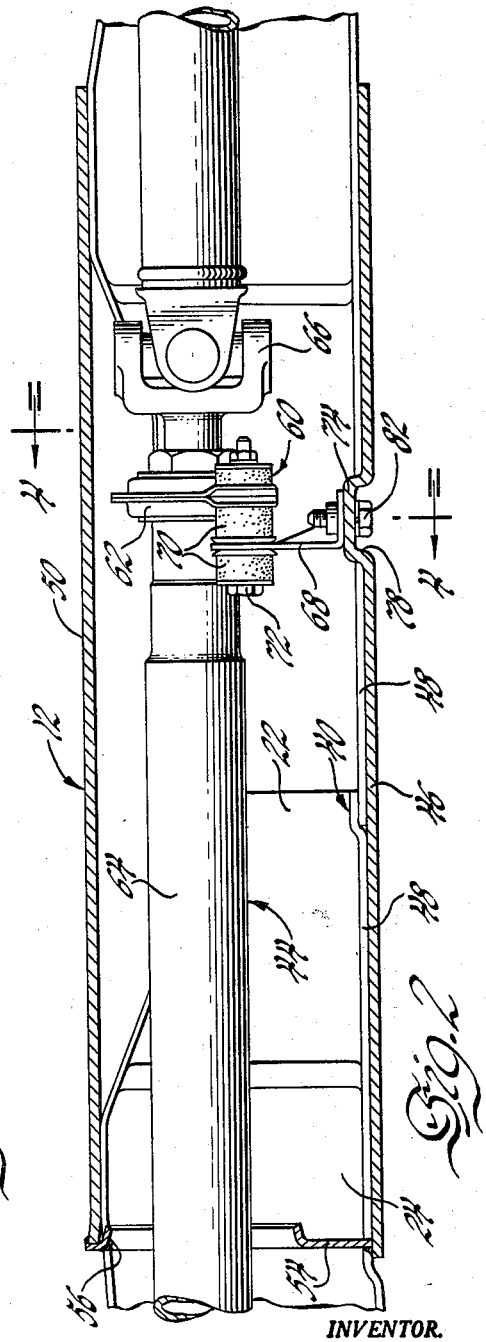
INVENTOR.
Harry M. Purdy
BY
L. D. Burch
ATTORNEY.

INVENTOR.
Harry M. Purdy
BY
L. D. Busch
ATTORNEY.

United States Patent Office 2,963,300
Patented Dec. 6, 1960

2,963,300

VEHICLE FRAME

Harry M. Purdy, Detroit, Mich., assignor to General Motors Corporation, Detroit, Mich., a corporation of Delaware Filed Sept. 25, 1956, Ser. No. 612,021

4 Claims. (Cl. 280—106)

This invention relates to structural frame members in general and more particularly to frames used with automotive and other vehicles.

It is here proposed to provide a cruciform type vehicle frame having a drive shaft tunnel section provided centrally thereof that is formed from the converging frame rails and which serves as a reinforcing structural part of the frame member. It is proposed to make use of box-sectioned side rails having their inner side walls relieved within the center section tunnel area to accommodate the vehicle drive shaft while permitting the adjacently disposed frame rails to be closer together at the center section for greater structural strength.

Aside from the structural advantages of the proposed frame construction there is appreciable manufacturing facility to be realized. The proposed frame is made up of four separate frame rails joined together and having a pair of plate members forming a box-sectioned center section therewith. Thus, the forward end of the frame may be assembled completely separately of the after end. This makes smaller units to be handled until the final assembly of placing the ends together and providing the center tunnel section.

These and other advantages of the proposed vehicle frame will be appreciated as the disclosed frame structure is described in more detail.

In the drawings:

Figure 1 is a top view of an assembled vehicle frame embodying the principles of this invention.

Figure 2 is an enlarged cross-sectional view through the center section of the proposed frame as seen substantially in the plane of line 2—2 of Figure 1, looking in the direction of the arrows.

Figure 3:
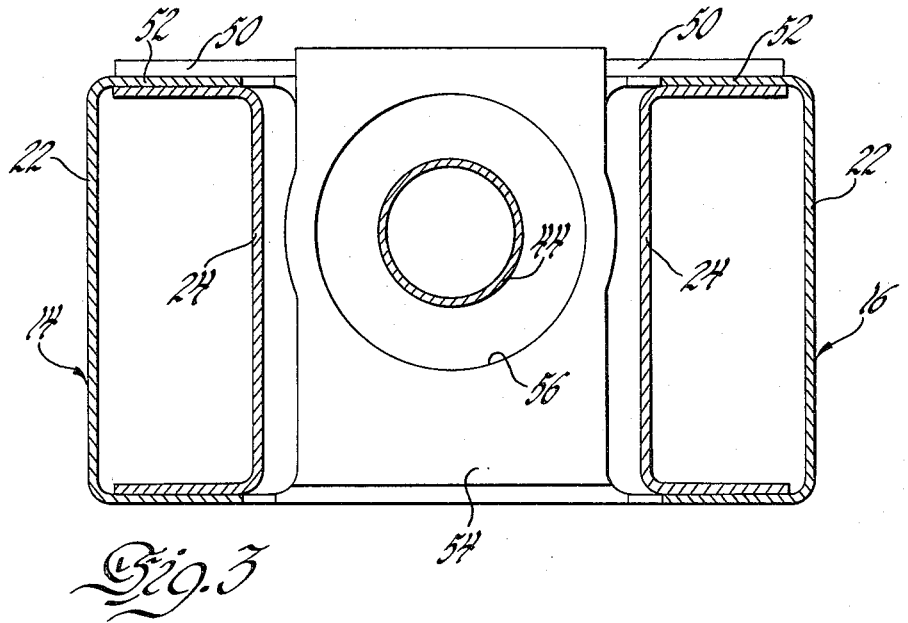
Figure 3 is an enlarged cross-sectional view just forward of the frame center section as seen in the plane of line 3—3 of Figure 1, looking in the direction of the arrows thereon.

The cruciform type vehicle frame 10 shown by the drawings includes a center section 12 having one pair of frame rails, comprising rails 14 and 16, extending forwardly and divergently outward therefrom and another pair of frame rails, comprising rails 18 and 20, extending rearwardly in the same manner. Each of the frame rails 14, 16, 18 and 20 is made up of channel members 22 and 24 secured together to provide a box-sectioned frame member, as shown in Figure 3. The forwardly extending rails have cross braces 26, 28 and 30 secured therebetween. Brace 26 is such as supports the vehicle front suspension system. Other structural braces 32, 34 and 36 are provided between the rearwardly extending frame rails and all the frame rails have body brackets 38 secured thereto upon which a vehicle body may be received.

The center section 12 of the vehicle frame is formed from the ends of the outermost channel members 22 of each of the frame rails 14, 16, 18 and 20 disposed in adjacent and end-to-end relation. Those channel members 22 on the same side of the vehicle frame are secured in end-to-end relation, as by having the end of channel member 22 of frame rail 14 telescope over the end of channel member 22 of rail 18. Figure 2 shows the rail joint at 40.

The innermost channel member 24 of each of the frame rails 14, 16, 18 and 20 is terminated short of the end of the outermost channel member 22 of each rail and is bent over to engage the outermost channel as is shown at 42 in the cut-away section of Figure 1. This leaves the center section 12 free of the innermost channels so that a vehicle drive shaft 44 may be received therethrough.

The center section 12 is closed, or boxed in, by a flat plate 46 which is secured to the lowermost flanges 48 of the outermost channel members of each of the frame rails and by another plate member 50 which is received over the uppermost flanges 52 of each of the rails. A further center section reinforcement is provided by a gusset 54 secured between channel members 24 at the forward end of the center section 12. A central opening 56 is provided within gusset 54 to receive the drive shaft 44 therethrough.

Figure 4:
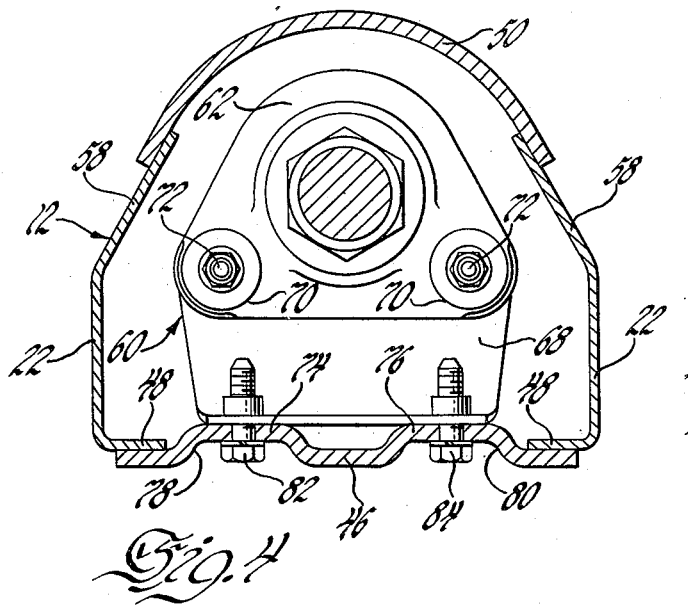
Figure 4 is a cross-sectional view through the frame center section taken in the plane of line 4—4 of Figure 2 and looking in the direction of the arrows thereon.

The upper plate 50 is formed much like a saddle to give added structural strength to the frame center section. The side walls 58 of the outermost channel members 22 are cut down and re-formed, as is shown in Figure 4, and the side edges of plate 50 are formed over to engage the re-formed channel side walls and form an arcuate cover therewith.

Where a two-piece vehicle drive shaft is used with the proposed frame a center bearing support 60 may be provided within the frame center section 12. The bearing support includes a bearing retainer 62 received about the after end of the forward section 64 of the drive shaft, just forward of the universal joint 66, and which is supported by a bracket 68 secured to the bottom plate 46 of the drive shaft tunnel section 12 of the frame. The bearing retainer 62 is insulated from the frame bracket 68 by rubber biscuits 70 held in compression by bolt means 72. The bracket 68 is located within the tunnel section 12 upon dimpled portions 74 and 76 formed from the bottom plate 46; which also serves to provide recesses 78 and 80 for the heads of the bolt fasteners 82 and 84.

The proposed vehicle frame structure may be made up by having each of the frame rails 14, 16, 18 and 20 formed separately and then joined together with the plate members 46 and 50 to provide the center section 12. Or, if desired, the forward frame rails 14 and 16, as well as the after rails 18 and 20, may have the various cross braces and body brackets secured thereto, with any other chassis components if desired, prior to joining the pairs of frame rails and forming the center section.

I claim:

1. In a backbone-type vehicle frame, a pair of side rails disposed along the sides of the frame and extending the length thereof with the central portion of each side rail bent inwardly toward the longitudinal center line of the frame to provide a central section disposed in close proximity to the corresponding central section of the other member, each of said side rails including a channel shaped outer member extending continuously from one end of the frame to the other and a pair of channel shaped inner members extending from the ends of the frame inwardly to the central portion of the frame and secured to the outer member to form a generally box-shaped cross-section for the side rail, the inner end portion of each inner member being bent outwardly and secured to the corresponding outer member, a top plate connecting the outer members at the central portions thereof, a bottom plate connecting the central portions of the outer members and defining a tunnel for a drive shaft in combination with the outer members and said top plate, and a bulkhead enclosing an end of said tunnel and secured edgewise between the webs of said inner members adjacent the bend therein and secured to the top and bottom plates, said bulkhead in combination with the bent inner ends of said inner members preventing parallelogramming of the tunnel area of the frame and increasing the rigidity thereof.

2. In a backbone-type vehicle frame, a pair of side rails disposed along the sides of the frame and extending substantially the length thereof with the central portion of each side rail being bent inwardly toward the longitudinal center line of the frame, each of said side rails including a channel shaped outer member extending continuously through said central portion and a pair of channel shaped inner members extending from the central portion of the frame outwardly toward the outer ends of the frame and secured to the outer member to form a generally box-shaped cross section for the side rail, a top plate connecting the outer members at the central portions thereof, a bottom plate connecting the central portions of the outer members and defining a central tunnel in combination with the outer members and said top plate, and a bulkhead enclosing an end of the tunnel and secured edgewise between the webs of said outer members, said bulkhead preventing parallelogramming of the tunnel area of the frame and increasing the rigidity thereof.

3. In a backbone-type vehicle frame, a pair of side rails disposed along the sides of the frame and extending the length thereof with the central portion of each side rail being bent inwardly toward the longitudinal center line of the frame to provide the frame with a generally X-shape, each of said side rails including a channel shaped outer member extending continuously from one end of the frame to the other and a pair of channel shaped inner members extending from the central portion outwardly toward the ends of the frame and secured to the outer member to form a generally box-shaped cross section for the side rail, a top plate connecting the outer members at the central portion thereof, a bottom plate connecting the central portions of the outer members and defining a tunnel for a drive shaft in combination with the outer members and said top plate, and a bulkhead enclosing an end of the tunnel and secured edgewise between the webs of said outer members and secured to said top and bottom plates, the inner ends of said inner side rail members being secured to the outer surface of said bulkhead, said bulkhead preventing parallelogramming of the tunnel area of the frame and increasing the rigidity thereof.

4. A vehicle frame comprising channel section members secured together and forming box-sectioned frame rails, pairs of said frame rails extending divergently forwardly and rearwardly of said frame, the innermost channel section members of said frame rails terminating short of the inner ends of the outermost of said channel section members and being formed over to engage said outermost channel section members, the inner ends of the outermost channel section members on the same side of said frame being aligned in end-to-end relation and secured together, and plate members secured between the inner ends of said outermost channel section members for forming an open ended box-sectioned center section therewith for receiving a vehicle drive shaft therethrough, the outermost channel members of said frame rails being reformed at said center section to include upwardly extended side walls and the uppermost of said plate members has the edges thereof formed over to engage said side walls for forming an arcuate cover thereover.

References Cited in the file of this patent
UNITED STATES PATENTS

| | | |
|---|---|---|
| 2,090,990 | Wheat | Aug. 24, 1937 |
| 2,113,540 | Maddock | Apr. 5, 1938 |
| 2,174,915 | Dietrich | Oct. 3, 1939 |
| 2,301,330 | Schafer | Nov. 10, 1942 |
| 2,609,217 | Hess | Sept. 2, 1952 |

FOREIGN PATENTS

| | | |
|---|---|---|
| 456,412 | Great Britain | Nov. 9, 1936 |